US009316320B2

(12) United States Patent
Cho

(10) Patent No.: US 9,316,320 B2
(45) Date of Patent: Apr. 19, 2016

(54) OIL DEFLECTOR

(71) Applicant: Jeong Bong Cho, Busan (KR)

(72) Inventor: Jeong Bong Cho, Busan (KR)

( * ) Notice: Subject to any disclaimer, the term of this patent is extended or adjusted under 35 U.S.C. 154(b) by 133 days.

(21) Appl. No.: 14/261,927

(22) Filed: Apr. 25, 2014

(65) Prior Publication Data

US 2015/0001807 A1    Jan. 1, 2015

(30) Foreign Application Priority Data

Jun. 28, 2013  (KR) ........................ 10-2013-0075229

(51) Int. Cl.
*F16J 15/40*       (2006.01)
*F16J 15/00*       (2006.01)
*F16J 15/447*      (2006.01)
*F16J 15/32*       (2006.01)
*F16J 15/44*       (2006.01)

(52) U.S. Cl.
CPC ............ *F16J 15/4472* (2013.01); *F16J 15/002* (2013.01); *F16J 15/3288* (2013.01); *F16J 15/3292* (2013.01); *F16J 15/445* (2013.01); *F16J 15/40* (2013.01)

(58) Field of Classification Search
CPC ... F16J 15/002; F16J 15/3288; F16J 15/3292; F16J 15/40; F16J 15/406; F16J 15/44; F16J 15/441; F16J 15/442; F16J 15/445; F16J 15/447; F16J 15/4472; F16J 15/4474
See application file for complete search history.

(56) References Cited

U.S. PATENT DOCUMENTS

| 1,779,076 | A | * | 10/1930 | Ray | F16J 15/4472 277/347 |
| 2,356,011 | A | * | 8/1944 | Sheldon | F01D 11/005 277/347 |
| 4,103,905 | A | * | 8/1978 | Desmond | F16J 15/4472 277/413 |
| 4,350,345 | A | * | 9/1982 | Kalan | F16J 15/40 277/347 |
| 6,022,027 | A | * | 2/2000 | Chevrette | F16J 15/442 277/413 |
| 6,669,203 | B1 | * | 12/2003 | Mortzheim | F16J 15/3288 277/355 |
| 2002/0074730 | A1 | * | 6/2002 | Mayer | F16J 15/3288 277/355 |
| 2004/0222596 | A1 | * | 11/2004 | Zuo | F16J 15/442 277/413 |
| 2008/0169616 | A1 | * | 7/2008 | Awtar | F01D 11/025 277/593 |
| 2012/0201661 | A1 | * | 8/2012 | Pandey | F01D 11/04 415/175 |

FOREIGN PATENT DOCUMENTS

| JP | 10-238541 A | 9/1998 |
| JP | 2011-141029 A | 7/2011 |
| KR | 10-0825081 B1 | 4/2008 |
| KR | 10-1016210 B1 | 2/2011 |
| KR | 10-2011-0045754 A | 5/2011 |
| KR | 10-2011-0124611 A | 11/2011 |

* cited by examiner

*Primary Examiner* — Kristina Fulton
*Assistant Examiner* — Nicholas L Foster
(74) *Attorney, Agent, or Firm* — LRK Patent Law Firm

(57) ABSTRACT

An oil deflector includes: a ring support disposed to surround the outer periphery of a shaft and having a front surface support portion formed on the air side of the front portion thereof and a rear surface support portion formed on the bearing side of the rear portion thereof; a plurality of teeth mounted along the inner peripheries of the front surface support portion and the rear surface support portion of the ring support, respectively; and movable teeth mounted on the front outermost side (on the air side) of the teeth disposed along the inner periphery of the front surface support portion and on the rear outermost side (on the bearing side) of the teeth disposed along the inner periphery of the rear surface support portion, respectively.

1 Claim, 4 Drawing Sheets

OIL DEFLECTOR

BACKGROUND OF THE INVENTION

1. Field of the Invention

The present invention relates to an oil deflector, and more particularly, to an oil deflector that has movable teeth mounted on a front surface support portion and a rear surface support portion of a ring support supporting the outer periphery of a turbine shaft, wherein even if the shaft is vibrated in the state of a transient operation upon the activation of a steam turbine, the movable teeth are moved forward and backward in accordance with the vibration directions of the shaft.

2. Background of the Related Art

Basically, an oil deflector is disposed on the outside of a bearing housing of a power generation turbine and serves to prevent oil at the inside of the bearing housing from leaking to the outside of the bearing housing.

FIG. 1 is a schematic view showing a configuration of a conventional oil deflector.

As shown in FIG. 1, the conventional oil deflector includes a ring support 3 adapted to surround the outer peripheral surface of a shaft 1 of a generator or turbine and teeth 5 mounted on the inner peripheral surface of the ring support 3 in such a manner as to come into contact with the inner peripheral surface of the shaft 1 to prevent the leakage of oil.

According to the conventional oil deflector, however, minute clearances exist between the teeth 5 and the shaft 1, and accordingly, oil may leak through the minute clearances.

So as to gently supply oil to the shaft 1, especially, if oil forcedly blows, oil may spray to the air.

Further, fine dust in the air may be introduced into the minute clearances, and at this time, the introduction of the fine dust causes the friction and vibration between the shaft 1 and a bearing (not shown), which further makes the bearing and shaft abraded early, thus lowering the performance of the generator and turbine requiring precision and causing their malfunctions.

So as to solve the above-mentioned problems of the conventional oil deflector, another conventional oil deflector is shown in FIG. 2.

As shown in FIG. 2, another conventional oil deflector largely includes a ring support 30, a plurality of teeth 50, and brush seals 60. The ring support 30 is disposed to surround the outer periphery of a shaft 10, the plurality of teeth 50 is fixedly mounted on the inner periphery of the ring support 30 in such a manner as to come into contact with the outer periphery of the shaft 10 so as to prevent lubricating oil of a bearing (not shown) supporting the shaft 10 from leaking to the air side from the bearing side, and the brush seals 60 are mounted on the front and rear outermost sides of the teeth 50, respectively.

The ring support 30 has a front surface support portion 31 and a rear surface support portion 33 spaced apart from each other by a given distance on the front air side thereof and the rear bearing side thereof.

Further, the plurality of teeth 50 is mounted along the inner peripheries of the front surface support portion 31 and the rear surface support portion 33, respectively, and the brush seals 60 are mounted on the front outermost side of the teeth 50 disposed along the inner periphery of the front surface support portion 31 and on the rear outermost side of the teeth 50 disposed along the inner periphery of the rear surface support portion 33, respectively.

Each brush seal 60 is configured wherein bristles are continuously wound around a linear support bar in the longitudinal direction of the support bar, thus preventing oil from spraying and further preventing fine dust in the air from entering minute clearances.

According to another conventional oil deflector, however, if the turbine is initially operated or in a transient operating state, the shaft 10 is unstably rotated to cause vibration, and at this time, mutual interference between the shaft 10 and the brush seals 60 occurs due to their eccentricity, thus producing frictional heat and static electricity therebetween.

So as to remove the leakage problem of the brush seals 60 of the conventional oil deflector from the steam turbine, accordingly, it is desirable that the radial clearances between the shaft 10 as a rotating body and the brush seals 60 be small, but as the radial clearances between the shaft 10 and the brush seals 60 become small, the number of occurrences of mutual interference and the contacted time between the shaft 10 and the brush seals 60 are increased to cause the brush seals 60 to be abraded early.

Due to the abrasion of the brush seals 60, further, the clearances between the shaft 10 and the brush seals 60 become large, and an amount of steam leaking through the large clearances is increased to lower the efficiency of the turbine. In addition, oil excessively leaks and sprays through the open clearances, thus undesirably causing environmental pollution problems.

It is therefore noted that the mutual interference between the shaft 10 and the brush seals 60 and the teeth 50 still occur due to the vibration of the shaft 10, which produces frictional heat and static electricity between the contacted portions therebetween. As a result, various problems may occur in the order of the deformation of the shaft caused by the frictional heat, the early abrasion, the increment of the clearances due to the early abrasion, the invasion and attachment of foreign materials due to the increment of the clearances, the increment of vibration due to the attachment of foreign materials, the instability of equipment and the operation shutdown due to the increment of vibration, and the power supply troubles and recovery delay due to the operation shutdown.

SUMMARY OF THE INVENTION

Accordingly, the present invention has been made in view of the above-mentioned problems occurring in the prior art, and it is an object of the present invention to provide an oil deflector that has movable teeth mounted on a front surface support portion and a rear surface support portion of a ring support, wherein even if a shaft is vibrated in the state of a transient operation upon the activation of a steam turbine, the frictional heat with the shaft can be minimized and the generation of static electricity can be suppressed, while the movable teeth being moved forward and backward in accordance with the vibration directions of the shaft, so that the mutual interference between the shaft and the ring support can be minimized and the contacted state of the movable teeth with the shaft can be continuously maintained to prevent the steam and oil from leaking to the outside, thus improving the efficiency of the turbine.

It is another object of the present invention to provide an oil deflector wherein pressure gas behind a movable tooth mounted on a front surface support portion of a ring support is injected to the outer peripheral surface of a shaft, through an injection passage formed on the front surface support portion to introduce the pressure gas from the outside, to form an air curtain behind the movable tooth, so that the air curtain serves to prevent foreign materials from being introduced from the outside, prevent oil from spraying to the outside thereof from the inside thereof, and allow the heat generated by the friction between the shaft and a ring support to be cooled.

To accomplish the above-mentioned objects, according to the present invention, there is provided an oil deflector including: a ring support disposed to surround the outer periphery of a shaft and having a front surface support portion formed on the air side of the front portion thereof and a rear surface support portion formed on the bearing side of the rear portion thereof in such a manner as to be spaced apart from the front surface support portion by a given distance; a plurality of teeth mounted along the inner peripheries of the front surface support portion and the rear surface support portion of the ring support, respectively, each tooth having the end portion coming into contact with the outer periphery of the shaft so as to prevent oil from leaking to the air side from the bearing side; and movable teeth mounted on the front outermost side (on the air side) of the teeth disposed along the inner periphery of the front surface support portion and on the rear outermost side (on the bearing side) of the teeth disposed along the inner periphery of the rear surface support portion, respectively, wherein pressure gas behind the movable teeth mounted on the front surface support portion of the ring support is injected to the outer peripheral surface of the shaft to form an air curtain behind the movable teeth, the air curtain being adapted to prevent foreign materials from being introduced from the outside and to prevent oil from spraying to the outside thereof from the inside thereof.

According to the present invention, desirably, an injection passage is formed on the front surface support portion of the ring support, through which the pressure gas is introduced from the outside.

According to the present invention, desirably, each movable tooth has the shape of a ring concentric with the front surface support portion and the rear surface support portion of the ring support and is segmented into a plurality of parts groove-coupled to the inner peripheral surface of the front surface support portion and the rear surface support portion of the ring support, while having an elastic member insertedly mounted on the inner surface of the groove-coupled portion thereof in such a manner as to pressurize the movable tooth toward the center of the shaft.

According to the present invention, desirably, each movable tooth is made of engineering plastics or aluminum alloys.

BRIEF DESCRIPTION OF THE DRAWINGS

The above and other objects, features and advantages of the present invention will be apparent from the following detailed description of the preferred embodiments of the invention in conjunction with the accompanying drawings, in which.

DETAILED DESCRIPTION OF THE PREFERRED EMBODIMENT

Hereinafter, an explanation on an oil deflector according to the present invention will be in detail given with reference to the attached drawing.

Figure 1:
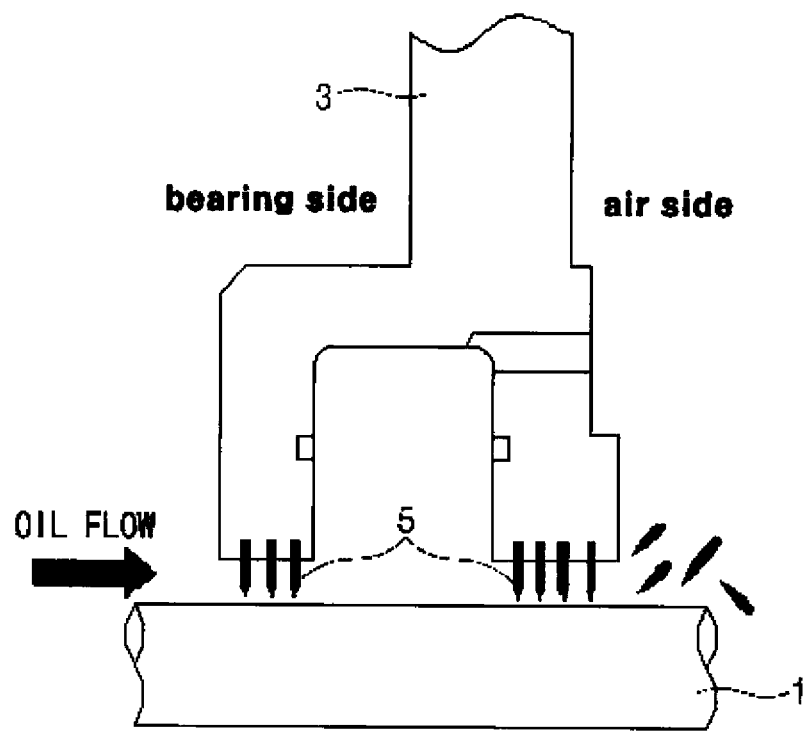
FIG. 1 is a schematic view showing a configuration of a conventional oil deflector.
Figure 2:
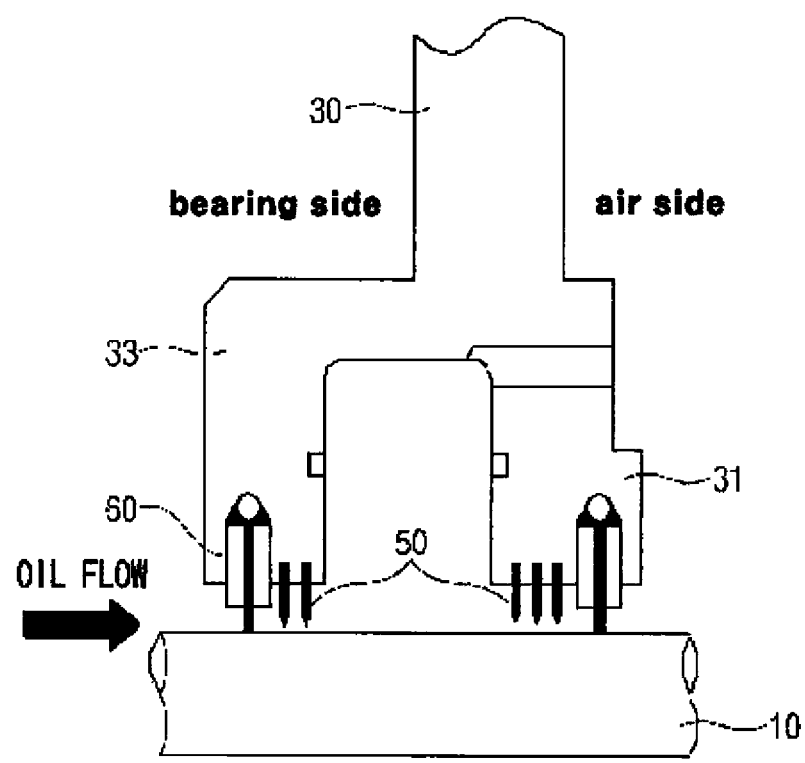
FIG. 2 is a schematic view showing a configuration of another conventional oil deflector.
Figure 3:
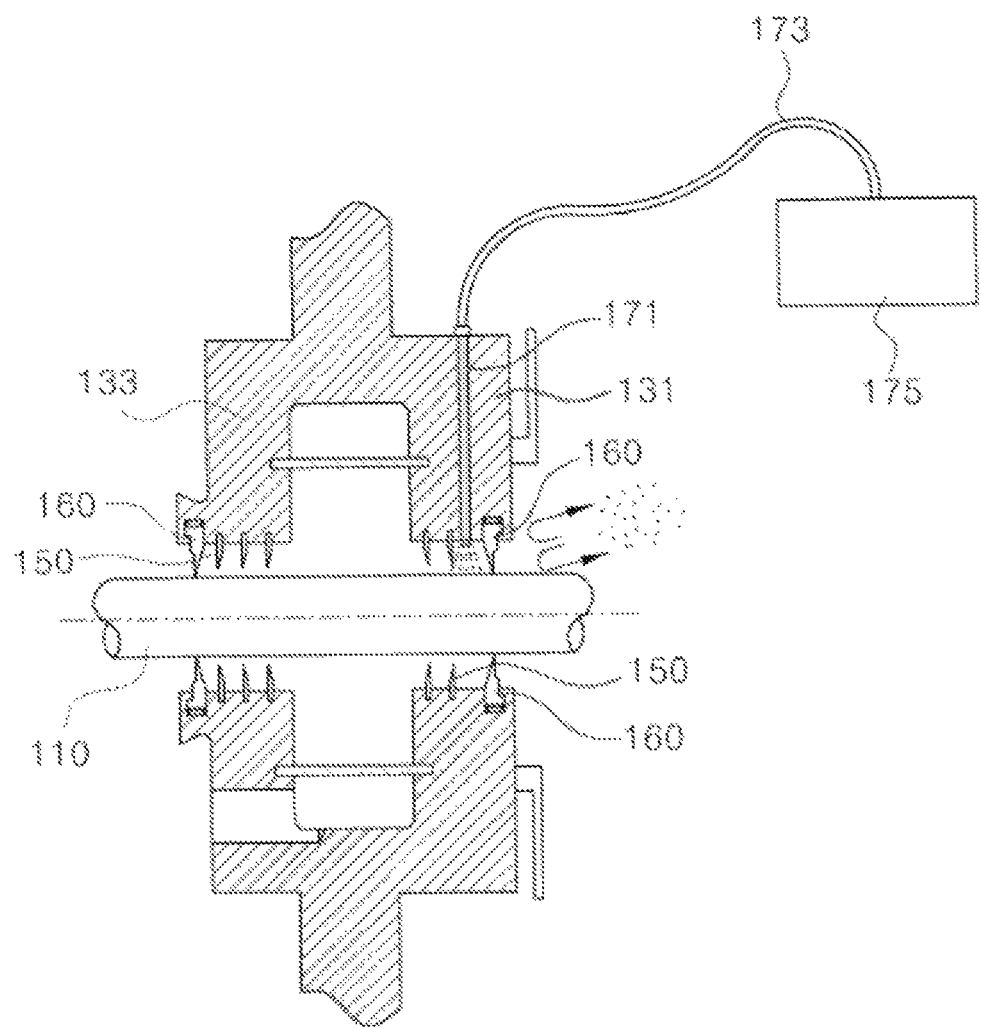
FIG. 3 is a schematic view showing a configuration of an oil deflector according to the present invention.
Figure 4:
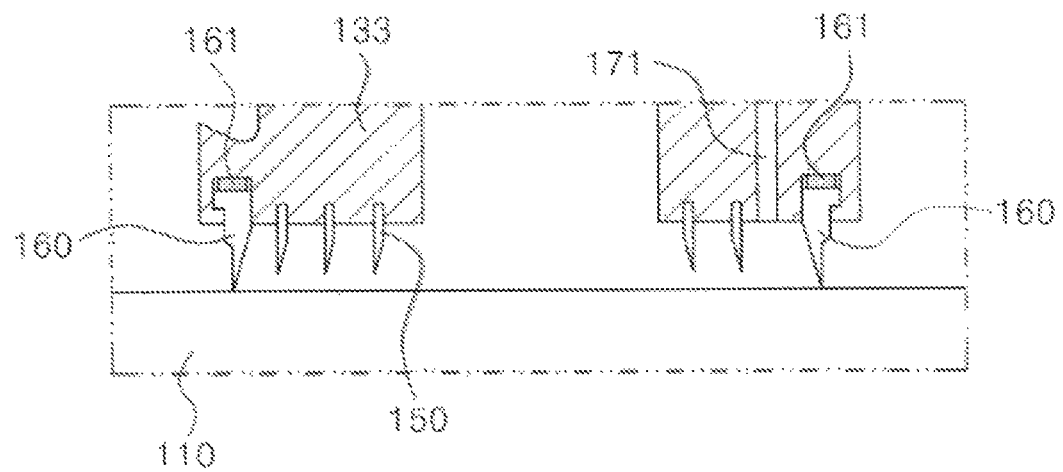
FIG. 4 is an enlarged view showing a main portion wherein movable teeth are disposed in the oil deflector according to the present invention.
Figure 5:
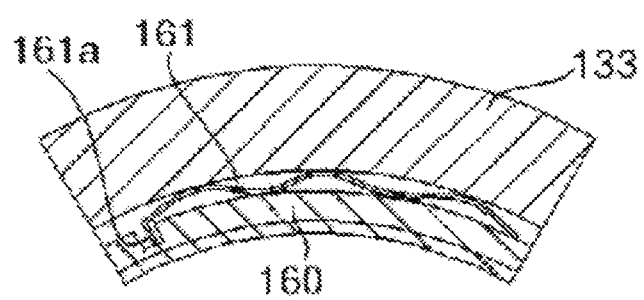
FIG. 5 is a sectional view showing a main portion wherein an elastic member is disposed in the oil deflector according to the present invention.

FIG. 3 is a schematic view showing a configuration of an oil deflector according to the present invention, FIG. 4 is an enlarged view showing a main portion wherein movable teeth are disposed in the oil deflector according to the present invention, and FIG. 5 is a sectional view showing a main portion wherein an elastic member is disposed in the oil deflector according to the present invention.

As shown in FIGS. 3 to 5, the present invention relates to an oil deflector that largely includes a ring support 130, teeth 150, and movable teeth 160.

At this time, the ring support 130 is disposed to surround the outer periphery of a shaft 110. As shown in FIG. 3, the ring support 130 has a front surface support portion 131 and a rear surface support portion 133 spaced apart from each other by a given distance on the front air side thereof and the rear bearing side thereof, and the front surface support portion 131 and the rear surface support portion 133 have two or three teeth 150 mounted along the inner peripheries thereof.

The teeth 150 are fixedly mounted on the inner periphery of the ring support 130 in such a manner as to come into contact with the outer periphery of the shaft 110 and adapted to prevent lubricating oil of a bearing (not shown) supporting the shaft 110 from leaking to the air side from the bearing side. The teeth 150 are multi-layered along the axial direction of the shaft 110.

The movable teeth 160 are mounted on the front outermost side of the teeth 150 disposed along the inner periphery of the front surface support portion 131 and on the rear outermost side of the teeth 150 disposed along the inner periphery of the rear surface support portion 133, respectively.

At this time, each movable tooth 160 has the shape of a ring concentric with the front surface support portion 131 and the rear surface support portion 133 and is segmented into a plurality of parts groove-coupled to the inner peripheral surface of the front surface support portion 131 and the rear surface support portion 133. Each movable tooth 160 has an elastic member 161 insertedly mounted on the inner surface of the groove-coupled portion thereof in such a manner as to pressurize the movable tooth 160 toward the center of the shaft 110.

At this time, each movable tooth 160 has a sharp edge formed at the contacted portion with the shaft 110.

As shown in FIG. 5, the elastic member 161 is provided in the form of a corrugated plate spring. At this time, the elastic member 161 has a concentric curvature with the shaft 110.

If the corrugated elastic member 161 is insertedly interposed between the movable tooth 160 and the ring support 130, three or more curved portions of the elastic member 161 come into contact with the movable tooth 160 and the ring support 130, thus providing a stable supporting structure.

At this time, the elastic member 161 has a stopper protrusion 161a formed on one end portion thereof, and the stopper protrusion 161a is locked to the groove portion formed on the outer surface of the movable tooth 160, thus preventing the rotational direction of the elastic member 161 from being moved.

The movable teeth 160 are mounted to at the same time pressurize the outer peripheral surface of the shaft 110, so that the elastic members 161 are compressed against the movable teeth 160 to which a pressure is applied upon the vibration of the shaft 110 to cause the movable teeth 160 to be moved backward, thus minimizing their abrasion due to the friction with the shaft 110, and contrarily, they are expanded by the open clearances between the movable teeth 160 located on the opposite side to the side wherein the pressure is applied to cause the movable teeth 160 to come into contact with the outer peripheral surface of the shaft 110, thus achieving their airtight state with the shaft 110.

Further, pressure gas behind the movable teeth 160 mounted on the front surface support portion 131 is injected to the outer peripheral surface of the shaft 110 to form an air curtain behind the movable teeth 160.

Such air curtain prevents foreign materials from being introduced from the outside and prevents oil from spraying to the outside thereof from the inside thereof.

Further, an injection passage 171 is formed on the front surface support portion 131, through which the pressure gas is introduced from the outside. The injection passage 171 is formed toward the inner side center of the ring support 130 from the outer peripheral surface thereof and connected to a separate supply line 173 through which the pressure gas is supplied from the outside.

At this time, the pressure gas used is compressed air whose pressure and supplied amount can be controlled by means of a supply controller 175 wherein the operating state of a turbine is recognized to determine the supplied pressure and on/off time points.

As described above, the oil deflector according to the present invention is provided with the movable teeth mounted on the front surface support portion and the rear surface support portion of the ring support, wherein even if the shaft is vibrated in the state of the transient operation upon the activation of the steam turbine, the frictional heat with the shaft can be minimized and the generation of static electricity can be suppressed, while the movable teeth being moved forward and backward in accordance with the vibration directions of the shaft, so that the mutual interference between the shaft and the ring support can be minimized and the contacted state of the movable teeth with the shaft can be continuously maintained to prevent the steam and oil from leaking, thus improving the efficiency of the turbine.

Further, the pressure gas behind the movable tooth mounted on the front surface support portion is injected to the outer peripheral surface of the shaft, through an injection passage formed on the front surface support portion to introduce the pressure gas from the outside, to form an air curtain behind the movable tooth, so that the air curtain is formed behind the movable tooth, thus preventing foreign materials from being introduced from the outside, preventing oil from spraying to the outside thereof from the inside thereof, and allowing the heat generated by the friction between the shaft and the ring support to be cooled.

While the present invention has been described with reference to the particular illustrative embodiments, it is not to be restricted by the embodiments but only by the appended claims. It is to be appreciated that those skilled in the art can change or modify the embodiments without departing from the scope and spirit of the present invention. For example, the materials, sizes and so on of the components defined in the embodiment of the present invention are described with reference to the attached drawings, but they may be varied in accordance with the aspects of the present invention.

What is claimed is:

1. An oil deflector comprising:

a ring support (130) disposed to surround an outer periphery of a shaft (110) and having a front surface support portion (131) formed on an air side of a front portion thereof and a rear surface support portion (133) formed on a bearing side of a rear portion thereof in such a manner as to be spaced apart from the front surface support portion (131) by a given distance; and a plurality of teeth (150) mounted along an inner periphery of the front surface support portion (131) and of the rear surface support portion (133) of the ring support (130), respectively, each tooth (150) having an end portion contacting with an outer periphery of the shaft (110) so as to prevent oil from leaking to the air side from the bearing side, movable teeth (160), wherein each movable tooth is mounted on a front outermost side of the teeth (150) disposed along the inner periphery of the front surface support portion (131) or on a rear outermost side of the teeth (150) disposed along the inner periphery of the rear surface support portion (133), respectively, and wherein pressurized gas behind the movable tooth (160) mounted on the front surface support portion (131) is injected to the outer peripheral surface of the shaft (110) through an injection passage (171) formed on the front surface support portion (131) so as to introduce the pressurized gas from an outside to form an air curtain behind the movable tooth (160) mounted on the front surface support portion, the air curtain being adapted to prevent foreign materials from being introduced from the outside and to prevent oil from spraying to the outside thereof from the inside thereof, each movable tooth (160) being made of an engineering plastic or an aluminum alloy and having the shape of a ring concentric with the front surface support portion (131) or the rear surface support portion (133), while being segmented into a plurality of parts groove-coupled to the inner peripheral surfaces of the front surface support portion (131) or the rear surface support portion (133), each movable tooth (160) having an elastic member (161) insertedly mounted on the inner surface of the groove-coupled portion thereof in such a manner as to bias the movable tooth (160) toward the center of the shaft (110), the elastic member (161) being provided in the form of a corrugated plate spring and having a stopper protrusion (161*a*) formed on one end portion thereof, the stopper protrusion (161*a*) being locked to a groove portion formed on the outer surface of the movable tooth (160) to prevent rotation of the elastic member (161).

* * * * *